United States Patent [19]
Davey et al.

[11] Patent Number: 5,865,026
[45] Date of Patent: Feb. 2, 1999

[54] SYSTEM AND METHOD FOR MONITORING A CATALYTIC CONVERTER USING ADAPTABLE INDICATOR THRESHOLD

[75] Inventors: Christopher Kirk Davey, Novi; Robert Joseph Jerger, Livonia, both of Mich.

[73] Assignee: Ford Global Technologies, Inc., Dearborn, Mich.

[21] Appl. No.: 786,493

[22] Filed: Jan. 21, 1997

[51] Int. Cl.⁶ .................................................. F01N 3/00
[52] U.S. Cl. ................. 60/274; 60/276; 60/277
[58] Field of Search ........................... 60/274, 276, 277; 73/118.1

[56] References Cited

U.S. PATENT DOCUMENTS

| | | | |
|---|---|---|---|
| 5,077,970 | 1/1992 | Hamburg | 60/274 |
| 5,289,678 | 3/1994 | Grutter | 60/277 |
| 5,357,753 | 10/1994 | Wade | 60/274 |
| 5,385,016 | 1/1995 | Zimlich et al. | 60/276 |
| 5,467,593 | 11/1995 | Vincent et al. | 60/274 |
| 5,758,490 | 6/1998 | Maki et al. | 60/274 |

FOREIGN PATENT DOCUMENTS

| | | |
|---|---|---|
| 03124909 | 5/1991 | Japan . |
| 05231136 | 9/1993 | Japan . |
| 05231137 | 9/1993 | Japan . |
| 05231138 | 9/1993 | Japan . |
| 05312026 | 11/1993 | Japan . |
| 06093845 | 4/1994 | Japan . |
| 06330741 | 11/1994 | Japan . |
| 07071234 | 3/1995 | Japan . |
| 07293233 | 11/1995 | Japan . |
| 07305644 | 11/1995 | Japan . |
| 07310534 | 11/1995 | Japan . |
| 08004522 | 1/1996 | Japan . |
| 08061052 | 3/1996 | Japan . |
| 08100639 | 4/1996 | Japan . |
| 08105318 | 4/1996 | Japan . |
| 08121147 | 5/1996 | Japan . |

*Primary Examiner*—Thomas E. Denion
*Attorney, Agent, or Firm*—Allan J. Lippa; Roger L. May

[57] ABSTRACT

A system and method for monitoring emissions by monitoring performance of a catalytic converter using a predetermined indicated threshold value include determining a current value for the indicator based on signals generated by at least one exhaust gas sensor, modifying a historical indicator value based on the current value, and adjusting the predetermined indicator threshold based on the historical indicator value. The predetermined indicator threshold is adjusted provided various adapt criteria are satisfied. The historical indicator value is compared to the threshold to determine whether to generate a malfunction indicator signal. In one embodiment, emissions are indicated using a switch ratio based on the number of switches or transitions for upstream and downstream exhaust gas oxygen sensors.

11 Claims, 3 Drawing Sheets

SYSTEM AND METHOD FOR MONITORING A CATALYTIC CONVERTER USING ADAPTABLE INDICATOR THRESHOLD

TECHNICAL FIELD

The present invention relates to systems and methods for monitoring a catalytic converter.

BACKGROUND ART

Increasingly stringent federal regulations limit the permissible levels for emissions. As such, vehicle manufacturers have developed various methods to reduce emissions while improving vehicle performance and fuel economy. Catalytic converters are often used to reduce emission levels of regulated exhaust gases. The conversion efficiency of a catalytic converter may be monitored using a pre-catalyst oxygen sensor (HEGO sensor) positioned upstream from the catalytic converter and a post-catalyst oxygen sensor (catalyst monitor sensor or CMS) positioned downstream from the catalytic converter. One method known for indicating conversion efficiency of the catalyst is to calculate a ratio of CMS transitions or switches to HEGO transitions or switches. An increasing switch ratio is generally indicative of a degrading catalyst. When the switch ratio exceeds a threshold value, a malfunction indicator light (MIL) is illuminated so the vehicle operator will seek service. As such, it is important to properly set the threshold value to reduce unnecessary or premature service indications while eliminating the possibility of an unacceptable catalyst being undetected.

The existing method for determining the failure switch ratio threshold value is based on samples obtained from prototype development vehicles. A simulated aging process is applied to the catalytic converters to produce emission threshold converters, i.e., converters with an unacceptable degraded efficiency. The emissions threshold converters are installed on vehicles and tested under various operating conditions, such as varying ambient temperature, varying engine load, varying altitude, and the like, to determine representative switch ratios. This testing may span several months and requires numerous man-hours to complete. The collected switch ratios are then used to establish a statistically reliable failure switch ratio threshold, typically set to three standard deviations below the mean switch ratio of the emissions threshold converters.

Any changes made to the vehicle which may affect emissions levels require additional testing to verify or re-establish the failure threshold. In addition, while the simulated aging process provides a good estimate, it may not be truly representative of actual catalyst performance over the time represented by the simulation.

DISCLOSURE OF THE INVENTION

It is thus a general object of the present invention to provide a method and system for accurately setting the failure threshold for a catalytic converter monitor or indicator based on vehicle-specific data.

In carrying out the above object and other objects, features and advantages of the present invention, a method for monitoring emissions of an internal combustion engine is provided. The method preferably uses at least one exhaust gas sensor in communication with an engine control module including a memory having a predetermined exhaust emissions indicator threshold for indicating a corresponding predetermined level of exhaust emissions. The method includes determining a current value for an exhaust emissions indicator based on signals generated by the at least one exhaust gas sensor, modifying a historical exhaust emissions indicator value representing previously determined current values based on the current value, and adjusting the predetermined exhaust emissions indicator threshold based on the historical exhaust emissions indicator. In one embodiment, the predetermined threshold is adjusted based on the difference between the standard deviation of the historical indicator and the standard deviation used to set the predetermined threshold.

A system is also provided for monitoring performance of a catalytic converter in a vehicle having an internal combustion engine connected to the catalytic converter. The system includes a first exhaust gas sensor interposed the engine and the catalytic converter (i.e. upstream from the converter), a second exhaust gas sensor positioned downstream from the catalytic converter, and a controller having a memory with a predetermined threshold for a catalyst efficiency indicator. The controller communicates with the first and second exhaust gas sensors for determining a current value of the catalyst efficiency indicator based on a ratio of observed transitions of the second exhaust gas sensor and observed transitions of the first exhaust gas sensor. The controller modifies a historical value for the catalyst efficiency indicator based on the current value, calculates at least one statistical parameter based on the historical value, and adjusts the threshold for the catalyst efficiency indicator based on the at least one statistical parameter to produce a modified threshold. When the current value, or historical value, of the efficiency indicator exceeds the modified threshold, a malfunction indicator signal is generated.

The advantages associated with the present invention are numerous. For example, the present invention uses actual data gathered for each vehicle to determine an appropriate failure indication threshold rather than depending solely upon samples collected from development vehicles with components subjected to simulated aging. The present invention adjusts the malfunction indicator threshold based on a larger data set to result in more accurate and vehicle-specific statistical data. The increased accuracy reduces false or premature service indications while detecting degraded catalyst efficiency to alert the vehicle operator.

The above object and other objects, features, and advantages of the present invention, will be readily apparent from the following detailed description of the best mode for carrying out the invention when taken in connection with the accompanying drawings.

BEST MODE FOR CARRYING OUT THE PREFERRED EMBODIMENT

Figure 1:
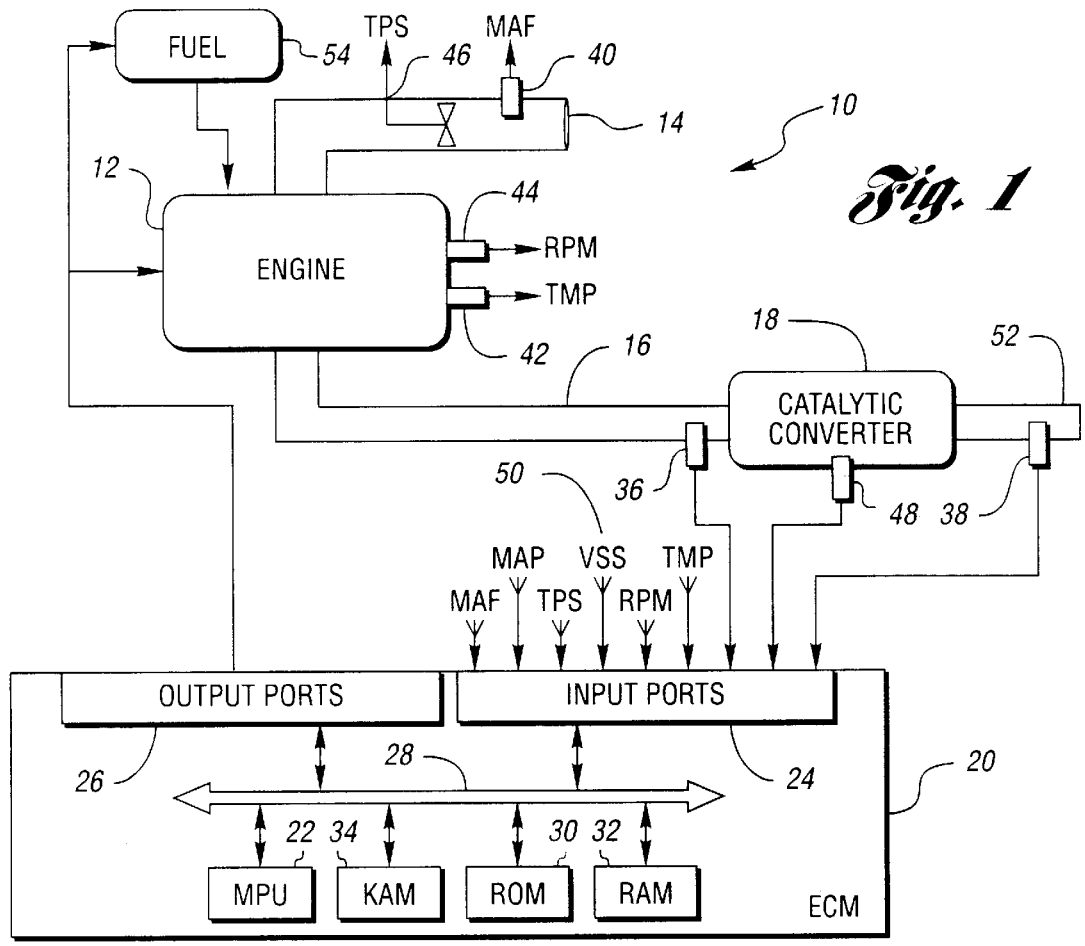
FIG. 1 is a block diagram of a system for monitoring a catalytic converter according to the present invention.

Referring now to FIG. 1, a block diagram illustrating a system for monitoring efficiency of a catalytic converter is shown. System 10 includes an internal combustion engine 12 having an intake 14 and an exhaust 16. Catalytic converter 18 is connected to exhaust 16 and a downstream section 52. An Engine Control Module (ECM) 20 includes a microprocessor 22 in communication with engine 12 via input ports 24 and output ports 26. Data and control bus 28 provides communication between microprocessor 22, input ports 24, output ports 26 and various computer readable storage media such as Read-Only Memory (ROM) 30, Random Access Memory (RAM) 32 and Keep-Alive Memory (KAM) 34. The computer readable storage media may be implemented by any of a number of known devices such as ROM, EPROM, EEPROM, flash memory, and the like.

As is known, ROM 30 is a data storage device which contains various program instructions, software, or control logic to effect control of engine 12. ROM 30 may also include various predetermined non-modifiable parameter values relative to operation of engine 12, such as an exhaust emissions indicator threshold value and corresponding standard deviation according to the present invention. Because ROM 30 is a non-volatile memory, power is not needed to maintain its contents. In contrast, RAM 32 is used for various working calculations and temporary storage of information. The contents of RAM are lost when power is removed, such as when the ignition key is turned off. KAM 34 is used to store various adaptive or learned parameters and is not reset when the engine is turned off. As such, in one embodiment of the present invention, KAM 34 is used to store the accumulated number of completed monitor cycles or trips and parameters relative to the historical emissions indicator, such as the average and standard deviation.

ECM 20 receives signals from various sensors which reflect current operating conditions of engine 12. An exhaust gas oxygen sensor, such as Heated Exhaust Gas Oxygen (HEGO) sensor 36 is used to detect the presence of oxygen in exhaust 16. HEGO sensor 36 communicates with ECM 20 via input port 24. Similarly, Catalyst Monitor Sensor (CMS) 38 monitors the presence or absence of oxygen in downstream exhaust 52 and provides a signal to ECM 20 via input port 24. Mass air flow sensor 40 provides an indication of the air flow mass through intake 14. Temperature sensor 42 provides an indication of the engine coolant temperature while RPM sensor 44 provides an indication of the current engine RPM. Other sensors connected to ECM 20 through input ports 24 may include Throttle Position Sensor (TPS) 46, exhaust gas temperature sensor 48 and Vehicle Speed Sensor (VSS) 50, among others.

ECM 20 uses control logic implemented in hardware and/or software to generate various signals to control engine 12. For example, ECM 20 generates an output signal to control fuel delivered to engine 12 by fuel control 54. ECM 20 controls the quantity and timing of fuel injection in addition to spark timing via signals passing through output ports 26. Temperature sensor 48 may be used to monitor the exhaust gas temperature from which the catalytic converter mid-bed temperature may be inferred.

In operation, ECM 20 is used to monitor performance of catalytic converter 18 using HEGO sensor 36 and CMS 38. ECM 20 calculates a ratio of observed transitions of CMS 38 to observed transitions of HEGO sensor 36 after an acceptable number of observed transitions of HEGO sensor 36 have occurred, i.e. after a complete monitor cycle or trip. ECM 20 then determines performance of the catalytic converter based on the transition or switch ratio. In one embodiment, the transition ratio is the ratio of observed CMS transitions to observed HEGO switches. Because it is difficult to measure the actual emissions levels for regulated exhaust gases, the transition ratio is used as an emissions level indicator. A malfunction or service indicator is energized when the transition ratio exceeds a threshold value. Of course, other emissions indicators or ratios with corresponding threshold values could also be used. After the current cycle has been completed and the current transition ratio has been calculated, the HEGO and CMS counters are reset for use during subsequent cycles.

While transitions may continuously occur during operation of engine 12, transitions are observed or counted only when certain global and local entry conditions have been satisfied. This provides for a more accurate indication of converter efficiency by monitoring performance only under similar engine operating conditions. The entry conditions are selected to insure that engine 12, catalytic converter 18, HEGO sensor 36, and CMS 38 have reached appropriate operating temperatures. Global entry conditions may include acceptable ranges for air charge temperature, engine coolant temperature, elapsed time in closed-loop operation, and elapsed time from engine start. Local entry conditions may include steady-state part throttle operation and operation within a particular mass air flow range, catalyst temperature range, vehicle speed range, and/or EGR range.

KAM 34 may be used to store various learned (adaptive) or historical data. For example, historical or learned data may include offsets for modifying nominal (predetermined) parameter values based on actual data acquired during operation of the vehicle to adjust to changes due to aging or wear. In one embodiment of the present invention, an accumulated number of transitions or switches for HEGO sensor 36 and for CMS 38 are stored in KAM 34. A historical switch ratio, preferably an average, based on previously determined switch ratios is also stored in KAM 34. In addition, various other statistical parameters such as mean, median, standard deviation, and the like may be calculated and stored in KAM 34 as explained in greater detail herein.

Various adaptable parameters may have nominal values which are stored in ROM 30 and then transferred or copied to KAM 34 during operation so that they may be modified. The nominal values are required for initial system operation and in the event that values stored in KAM 34 are lost. KAM 34 may be reset by removing power from the ECM 20, i.e. disconnecting the vehicle battery. Certain repairs may also require resetting values stored in KAM 34. In one embodiment of the present invention, a malfunction indicator threshold value is permanently stored in ROM 30 and copied to KAM 34 for adjustment or modification based on actual engine operation. In another embodiment, only an offset value based on actual engine operation is stored in KAM 34. The offset is combined with the nominal value stored in ROM 30 to produce a modified value whenever the threshold value is required.

Figure 2:
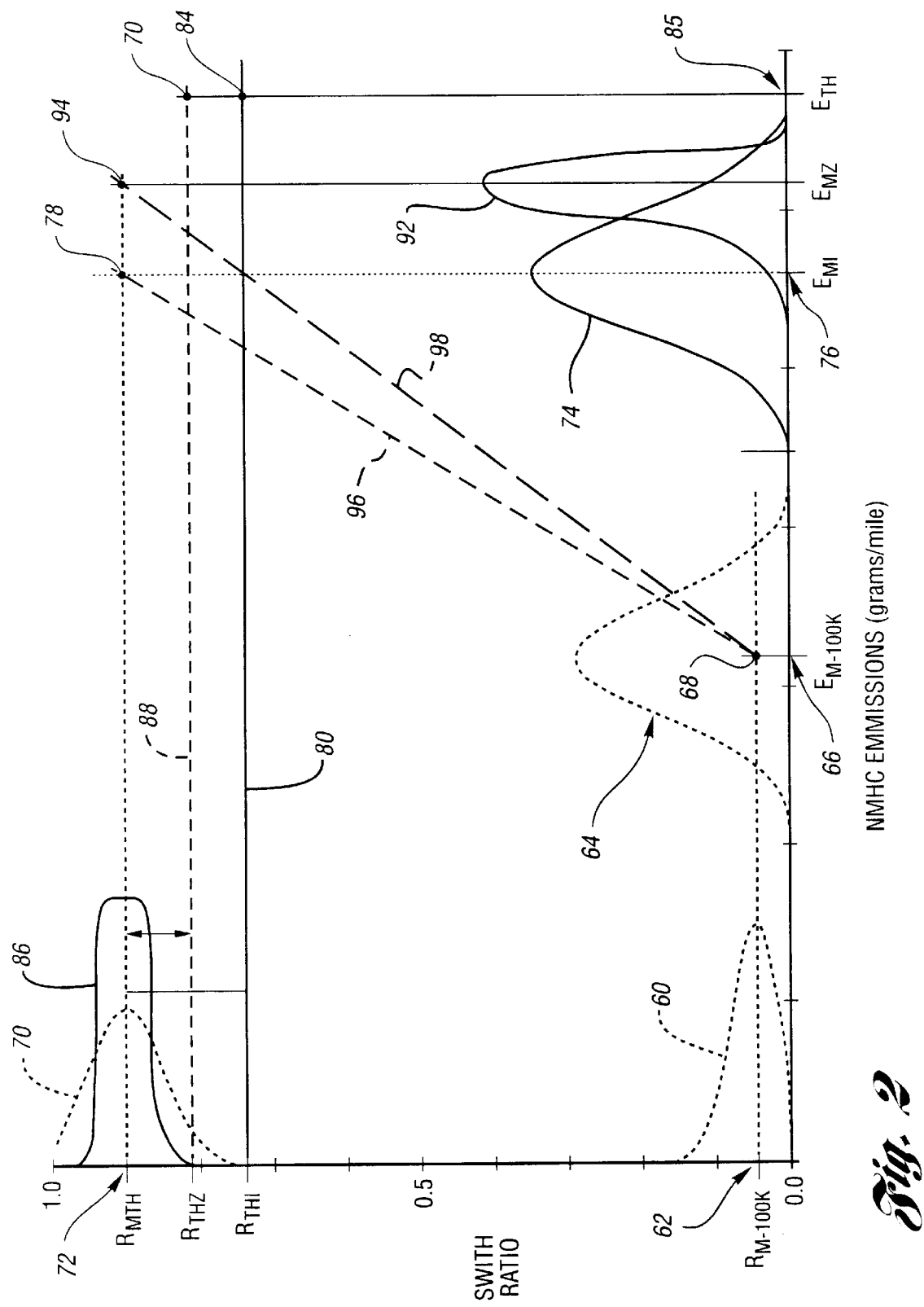
FIG. 2 graphically illustrates the setting and subsequent modification of a switch ratio threshold according to the present invention.

Referring now to FIG. 2, a graphical representation illustrating setting and subsequent modification of an emissions level indicator threshold according to the present invention is shown.

Data is gathered using prototype development vehicles to correlate an emissions indicator, preferably the switch ratio, with emission levels. FIG. 2 illustrates the correlation between switch ratio and non-methane hydrocarbon (NMHC) emissions. Data is gathered using prototype development vehicles under a variety of operating conditions. A baseline switch ratio distribution function 60 is plotted along the switch ratio (ordinate) axis. The baseline distribution function has a mean value 62 denoted by $R_{M\text{-}100K}$. The baseline converter has a corresponding emissions distribution function 64 which has an associated mean value 66, denoted by $E_{M\text{-}100K}$. The mean values for baseline switch ratio distribution 60 and baseline emissions distribution function 64 intersect at point 68.

A threshold level catalytic converter, i.e., a converter which has degraded to the point where emissions begin to exceed regulated levels, is installed on a number of test vehicles which are operated under various conditions to generate threshold switch ratio distribution function 70. The threshold switch ratio distribution corresponds to the threshold emissions distribution function 74 having mean value 76 denoted by $E_{M1}$. Threshold switch ratio distribution function 70 has an associated mean value 72 denoted by $R_{M\text{-}TH}$. The emissions indicator threshold value is preferably set to three standard deviations below the mean value 72 of distribution function 70, as represented by line 80. This is the switch ratio threshold ($R_{TH1}$) used to generate a malfunction indicator.

The mean values of distribution function 70 ($R_{MTH}$) and distribution function 74 ($E_{M1}$) intersect at point 78. Line 96, which extends between intersection point 68 and 78, represents a linear approximation of the relationship between switch ratio and emissions as the catalyst ages from the baseline to the threshold level. In actual operation, this relationship is nonlinear.

Mean value 76 of emissions threshold distribution function 74 is preferably positioned at three standard deviations below the allowable emissions threshold 82, also denoted by $E_{TH}$. This assures that substantially all degraded catalytic converters have a switch ratio above the switch ratio threshold 80. As such, substantially all of these converters generate a malfunction indicator signal before emissions exceed the regulated levels.

As explained in greater detail below, the present invention allows modification of the emissions indicator threshold value 80 based on actual operation of the associated catalytic converter. In operation, a current value for the exhaust emissions indicator is generated based on the switch ratio calculated after a completed monitor trip. This value may be used to generate a historical value, preferably an average value, which represents previously determined current values. Statistical parameters, such as mean, standard deviation, and the like, are calculated for the historical value. The statistical parameters may then be compared to the corresponding statistical parameters used to establish the switch ratio threshold based on a pre-production sample of prototype development vehicles.

With continuing reference to FIG. 2, the original switch ratio threshold 80 may be adjusted based on the statistical parameter of the historical exhaust emissions indicator to establish a new threshold level 88. The new threshold level, also denoted by $R_{TH2}$, is preferably set to three standard deviations below the original mean value 72. As such, the adjusted emissions indicator threshold would likely have a switch ratio distribution function 86 and a corresponding emissions distribution function 92 with a mean value $E_{M2}$. Due to a smaller actual standard deviation, emissions distribution function 92 remains three standard deviations below the regulated emissions threshold 82. As such, substantially all degraded catalytic converters will trigger a malfunction indicator prior to exceeding the regulated emissions level. The mean values for adjusted switch ratio threshold distribution function 86 and corresponding emissions distribution function 92 intersect at point 94. Line 98, extending between intersection point 68 and intersection point 94, represents a linear approximation of the relationship between the switch ratio and the emissions levels as the catalyst conversion efficiency decreases using the adjusted threshold level.

Figure 4:
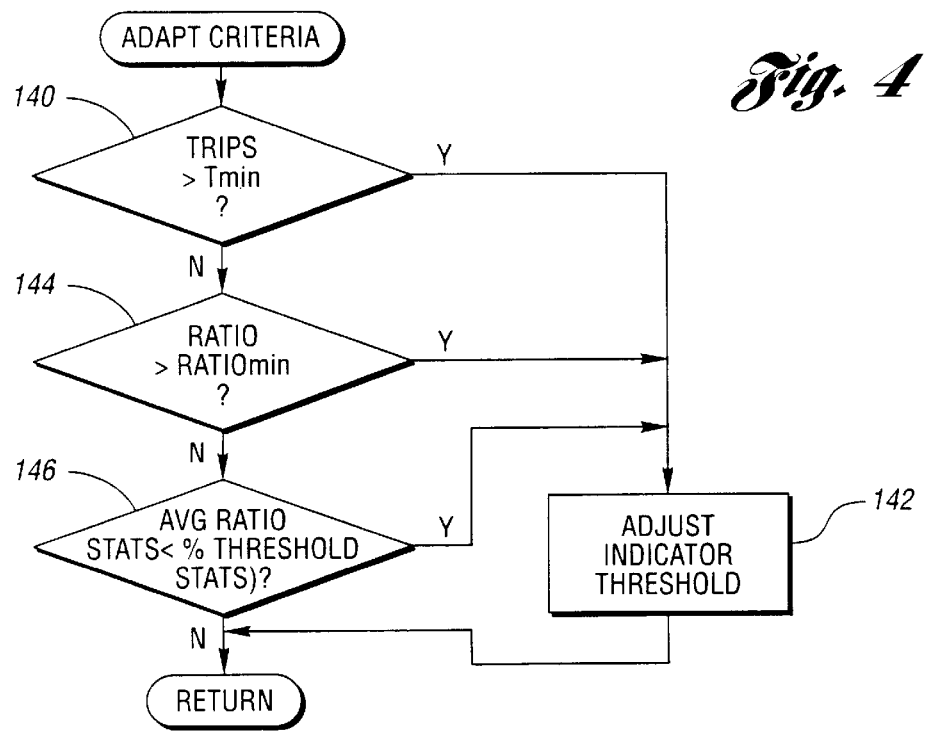
FIG. 4 is a flow diagram illustrating evaluation criteria for determining when to modify an emissions indicator threshold according to the present invention.
Figure 3:
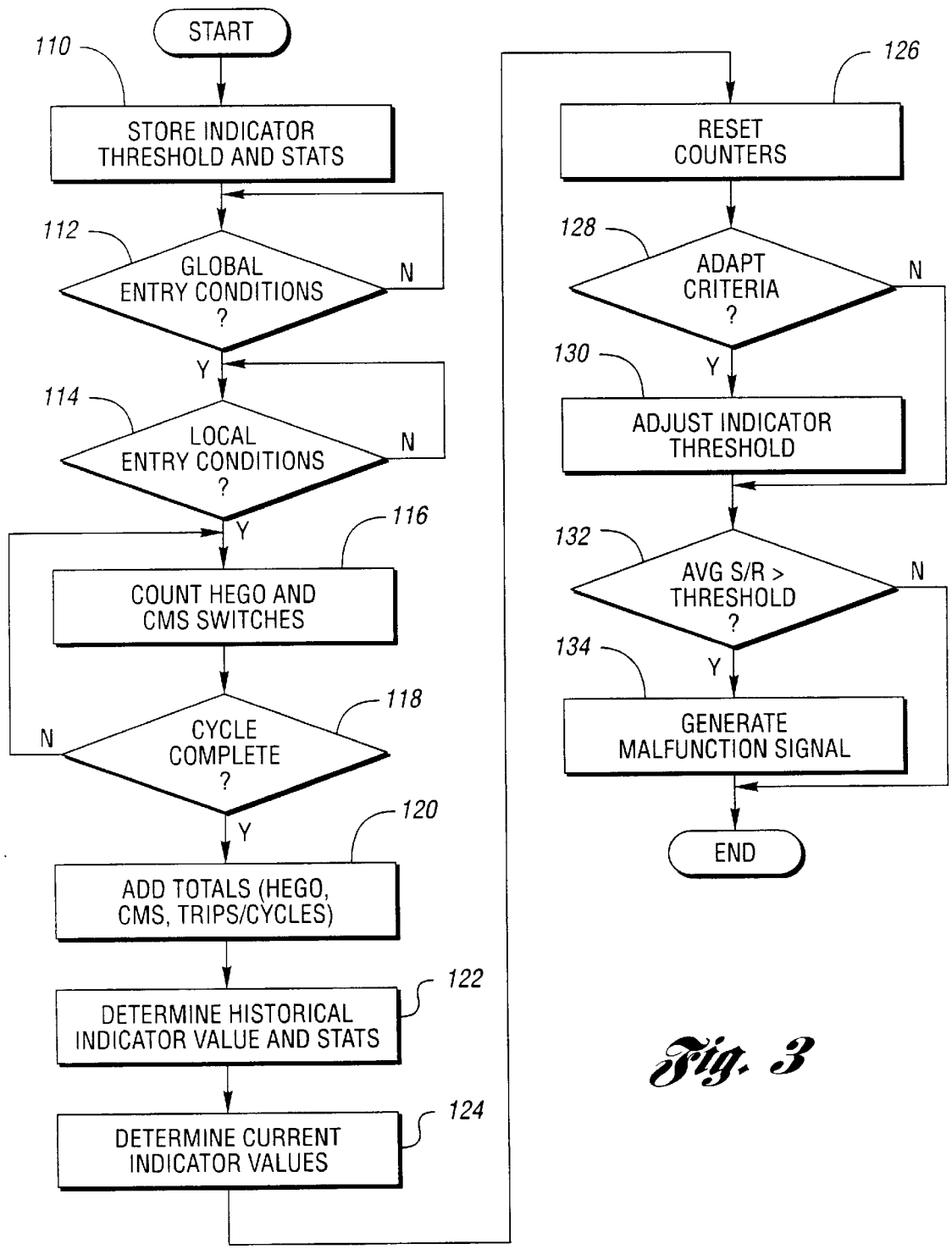
FIG. 3 is a flow diagram illustrating operation of a system and method for monitoring the catalytic converter efficiency according to the present invention.

Referring now to FIGS. 3 and 4, flow diagrams generally illustrating operation of a system or method according to the present invention are shown. As will be appreciated by one of ordinary skill in the art, the flow diagrams represent control logic which may be implemented in hardware, software, or a combination of hardware and software. Preferably, the control logic is stored in a computer readable medium, such as a PROM, EPROM, EEPROM, or flash memory, and represents program instructions which may be executed by a microprocessor. Of course, other implementations of the control logic using discrete components and/or custom integrated circuits, such as ASICs, are possible without departing from the spirit or scope of the present invention. One of ordinary skill in the art will also recognize that the particular order or sequence illustrated is not necessarily required to achieve the goals and objects of the present invention. FIGS. 3 and 4 show sequential operation of a system or method for ease of illustration and description only. As such, various programming and processing strategies may be used, such as interrupt-driven processing, parallel processing, or the like, depending upon the particular implementation.

Block 110 of FIG. 3 represents storing of an exhaust emissions indicator threshold value and corresponding statistical parameters. Preferably, the emissions indicator is a switch ratio and the statistical parameters include at least the average, or mean value, and standard deviation (or a multiple thereof). As described above, baseline values may be stored in a non-volatile memory and then transferred to a memory which allows changes to the threshold value and statistics based on vehicle-specific data collected during operation. Block 112 determines whether global entry conditions have been satisfied to enable catalyst monitoring. Block 114 determines whether local entry conditions have been satisfied in an attempt to monitor the catalyst over time under similar operating conditions.

After global entry conditions and local entry conditions are satisfied, switches or transitions of upstream (HEGO) and downstream (CMS) oxygen sensors are counted as represented by block 116. Switches are counted until block 118 determines that a monitor cycle or trip has been completed. In one embodiment, a trip is complete after a predetermined number of HEGO switches have been counted. In another embodiment, a predetermined number of HEGO switches must be counted for each of a plurality of air flow ranges. Once a trip has been completed, the data gathered from the current cycle is combined with historical data as indicated by block 120. This may include adding the current number of HEGO switches and CMS switches to corresponding accumulated totals and incrementing the trip/cycle counter. Various weighting or filtering functions may be applied in combining the current cycle data with the historical data. For example, current cycle data may be weighted so it has a greater impact on the historical data.

A historical emissions indicator value is determined along with its associated statistical parameters as indicated by block 122. In one embodiment, the historical indicator value represents the average switch ratio and the statistical parameters include the standard deviation of the switch ratio distribution. A switch ratio or other indicator value for the recently completed trip or monitor cycle is determined as indicated by block 124. The counters for the current cycle or trip are then reset, as indicated by block 126, in preparation for the next monitor cycle.

Block 128 determines whether appropriate criteria are met to modify or adapt the exhaust emissions indicator threshold value. The criteria are illustrated and described with reference to FIG. 4. If the adapt criteria are met, the indicator threshold is adjusted based on the value of the historical exhaust emissions indicator and/or associated statistics as determined by block 122. If the adapt criteria are not met, control passes to block 132 which compares the historical indicator value, i.e. the average switch ratio in one embodiment, to the indicator threshold. A malfunction signal is generated as represented by block 134 if the average switch ratio exceeds the threshold as determined by block 132. Alternatively, block 132 may use the current indicator value determined by block 124.

Referring now to FIG. 4, a flow diagram illustrating the adapt criteria is illustrated. Block 140 determines whether the number of trips or completed cycles is greater than a predetermined minimum number. Block 144 determines whether the average or historical indicator is greater than a predetermined minimum indicator value. For example, block 144 may determine whether the average switch ratio has exceeded a minimum ratio which is approximately two-thirds of the threshold ratio. Block 146 determines whether the statistical parameters for the historical indicator are less than a predetermined proportion or percentage of the corresponding statistical parameters for the originally set threshold level. For example, block 146 may determine whether the standard deviation for the switch ratio distribution function is less than seventy-five percent of the standard deviation used to determine the original switch ratio threshold. If any of the adapt criteria are met, block 142 sets an appropriate flag.

Of course, various other criteria may be used to determine whether to adjust the originally determined emissions indicator threshold value. Likewise, a combination of criteria may be required to be satisfied prior to changing the indicator threshold to assure an appropriate level of confidence.

Thus, the present invention uses actual data gathered for each vehicle to determine an appropriate threshold value rather than depending solely upon previously collected sample data. The increased accuracy provided by the vehicle-specific data reduces false or premature service indications while accurately detecting degraded catalyst efficiency to alert the operator.

While the best mode for carrying out the invention has been described in detail, those familiar with the art to which this invention relates will recognize various alternative designs and embodiments for practicing the invention as defined by the following claims.

What is claimed is:

1. A method for monitoring efficiency of a catalytic converter in a vehicle having an internal combustion engine connected to the catalytic converter and controlled by an engine controller having a memory for storing a malfunction indicator threshold value, the vehicle including an upstream exhaust gas oxygen sensor between the engine and the converter for providing voltage signals to the controller indicative of excursions from a stoichiometric combustion mixture and a downstream exhaust gas oxygen sensor interposed the converter and atmosphere for providing voltage signals to the controller indicative of conversion efficiency of the converter, the method comprising:

counting switches of the upstream sensor wherein a switch occurs when the voltage signal crosses a switching threshold;

counting switches of the downstream sensor wherein a switch occurs when the voltage signal varies in excess of a switching level;

determining a current value for the malfunction indicator after a predetermined number of switches of the upstream sensor have been observed, the current value being a ratio based on the switches of the upstream and downstream sensors;

calculating a historical value for the malfunction indicator based on the current value; and modifying the predetermined malfunction indicator threshold value based on the historical value.

2. The method of claim 1 further comprising:

storing number of upstream switches and downstream switches in the memory after a predetermined number of upstream switches have been observed.

3. The method of claim 1 further comprising:

determining at least one statistical parameter corresponding to the historical malfunction indicator value, wherein the step of modifying includes changing the predetermined malfunction indicator threshold level based on the at least one statistical parameter.

4. The method of claim 1 wherein the step of modifying comprises modifying the predetermined malfunction indicator threshold value based on a standard deviation corresponding to the historical malfunction indicator value and a standard deviation corresponding to the predetermined malfunction indicator threshold value.

5. The method of claim 1 further comprising:

comparing the historical malfunction indicator value with the predetermined malfunction indicator threshold value; and generating a malfunction indicator signal when the historical value exceeds the predetermined threshold value.

6. The method of claim 1 wherein the step of adjusting is performed based on standard deviation of the historical exhaust emissions indicator differing by a predetermined amount from a standard deviation corresponding to the predetermined exhaust emissions indicator threshold.

7. A system for monitoring performance of a catalytic converter in a vehicle having an internal combustion engine connected to the catalytic converter, the system comprising:

a first exhaust gas sensor between the engine and the catalytic converter;

a second exhaust gas sensor positioned downstream from the catalytic converter; and a controller having a memory with a predetermined threshold for a catalyst efficiency indicator, the controller being in communication with the first and second exhaust gas sensors for determining a current value of the catalyst efficiency indicator based on a ratio of observed transitions of the second exhaust gas sensor and observed transitions of the first exhaust gas sensor, modifying a historical value for the catalyst efficiency indicator based on the current value, calculating at least one statistical parameter based on the historical value, and adjusting the threshold for the catalyst efficiency indicator based on the at least one statistical parameter to produce a modified threshold.

8. The system of claim 7 wherein the controller determines the current value of the catalyst efficiency indicator only after a predetermined number of observed transitions of the first exhaust gas sensor.

9. The system of claim 7 wherein the first exhaust gas sensor generates a voltage signal based on presence of oxygen.

10. The system of claim 7 wherein the controller generates a malfunction signal when the historical value exceeds the modified threshold.

11. The system of claim 7 wherein the controller adjusts the threshold based on a predetermined difference between standard deviation associated with the historical value and standard deviation associated with the predetermined threshold.

* * * * *